US008817777B2

(12) United States Patent
Manian et al.

(10) Patent No.: US 8,817,777 B2
(45) Date of Patent: Aug. 26, 2014

(54) HYBRID UNIFIED COMMUNICATIONS DEPLOYMENT BETWEEN CLOUD AND ON-PREMISE

(75) Inventors: Vijay Manian, Sammamish, WA (US); Russell Andrew Penar, Woodinville, WA (US); Mahendra D. Sekaran, Sammamish, WA (US); Danny Levin, Redmond, WA (US); Sankaran Narayanan, Redmond, WA (US); Roy Kuntz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/207,370

(22) Filed: Aug. 10, 2011

(65) Prior Publication Data

US 2013/0039360 A1 Feb. 14, 2013

(51) Int. Cl.
*H04L 12/66* (2006.01)
*G06F 15/16* (2006.01)
*H04M 1/64* (2006.01)
*H04M 11/00* (2006.01)
*H04L 12/58* (2006.01)
*H04L 29/08* (2006.01)
*H04M 3/42* (2006.01)

(52) U.S. Cl.
CPC .............. *H04L 12/589* (2013.01); *H04L 67/10* (2013.01); *H04L 51/36* (2013.01); *H04M 3/42365* (2013.01); *H04M 2207/20* (2013.01); *H04M 2203/4509* (2013.01)
USPC ........ 370/352; 709/204; 709/201; 379/88.17; 379/90.01

(58) Field of Classification Search
USPC ........ 370/352; 709/206, 204; 379/88.17, 90.1
See application file for complete search history.

(56) References Cited

U.S. PATENT DOCUMENTS

| 6,831,966 | B1 | 12/2004 | Tegan et al. ................ 379/88.16 |
| 2003/0095541 | A1* | 5/2003 | Chang et al. .................. 370/352 |
| 2007/0115924 | A1* | 5/2007 | Schneider et al. ............ 370/352 |
| 2007/0115940 | A1 | 5/2007 | Kamen et al. ................. 370/352 |
| 2007/0150480 | A1* | 6/2007 | Hwang et al. ................... 707/10 |

(Continued)

OTHER PUBLICATIONS

Cisco; "*Introducing Cisco Hosted Unified Communications Services*"; accessed Jun. 3, 2011 at www.cisco.com/en-US/docs/voice_ip_comm/hucs/7.1a/user/CH1_HUCS.hml; 5 pgs.

(Continued)

*Primary Examiner* — Nicholas Jensen
(74) *Attorney, Agent, or Firm* — Andrew Smith; Micky Minhas

(57) ABSTRACT

A hybrid Unified Communications (UC) telephony deployment includes users of a tenant that are hosted between a UC cloud deployment and a UC on-premise deployment that offers PSTN connectivity for the users. An identity of a tenant and its' users are maintained consistently between the on-premise and cloud based UC deployment (e.g. telephone numbers, dialing preferences, voice mail . . . ). Each user of the tenant can register with the UC service from one or more locations (e.g. on-premise, off-premise . . . ) whether or not they are hosted by the on-premise deployment or the cloud based UC deployment. Functionality of the UC deployment may also be maintained at one or more locations within the hybrid UC deployment. For example, some services (e.g. voicemail, or other services) can be hosted in the cloud while the remaining services are hosted on-premise. Different Telco providers may be chosen by the tenant to provide PSTN services for one or more users of the tenant.

20 Claims, 5 Drawing Sheets

(56) References Cited

U.S. PATENT DOCUMENTS

| | | | |
|---|---|---|---|
| 2007/0189264 A1* | 8/2007 | Liu | 370/351 |
| 2008/0082782 A1 | 4/2008 | Meijer | |
| 2009/0116634 A1 | 5/2009 | Leving | |
| 2009/0238194 A1 | 9/2009 | Basart et al. | 370/401 |
| 2010/0310062 A1 | 12/2010 | Srinivasan | |
| 2011/0113142 A1 | 5/2011 | Rangegowda | |
| 2011/0145439 A1 | 6/2011 | Chaturvedi | |
| 2012/0008753 A1* | 1/2012 | Burnett et al. | 379/88.17 |
| 2012/0084357 A1* | 4/2012 | Richards et al. | 709/204 |
| 2012/0134355 A1* | 5/2012 | Vendrow et al. | 370/389 |

OTHER PUBLICATIONS

Microsoft; "*Microsoft Database Solutions—Meeting the Full Range of Data Management Needs in Your Organization*"; Dec. 2010; download.microsoft.com/download/5/5/C/55C41116-7318-4B8C-A535-A8C6DEDB709A/Microsoft%20Database%20Solutions.doc; 20 pgs.

Allaboutthecloudallthetime.com; "*Important Changes to Microsoft Online's Hosted BlackBerry Service*"; Apr. 7, 2011; accessed Jun. 3, 2011 at www.allcloudallthetime.com/office-365/; 14 pgs.

Polycom; "*Polycom and BroadSoft Help Service Providers Move from Hosted Voice to Cloud-Based Unified Communication Services*"; Dec. 2010; www.polycom.com/global/documents/whitepapers/hosted-voice-to-cloud-based-uc-services.pdf; 5 pgs.

Cabuk, et al.; "*Towards Automated Security Policy Enforcement in Multi-tenant Virtual Data Centers*" Nov. 30, 2009; Journal of Computer Security, pp. 89-121; www.google.co.in/url?sa=t&source=web&cd=1&ved=0CBgQFjAA&url=http%3A%2Fwww.sirrix.de%2Fmedia%2Fdownloads%2F59725.pdf%2Cdownload&ei=UX3o7HoPcvQPClengDw&usg=AFQjCNGQRi839KR91bBPqn9kui3D1GHGQ; 33 pgs.

International Search Report mailed Dec. 26, 2012, in Appl. No. PCT/US2012/049407.

* cited by examiner

HYBRID UNIFIED COMMUNICATIONS DEPLOYMENT BETWEEN CLOUD AND ON-PREMISE

BACKGROUND

Unified communications (UC) including telephony and connectivity with a public switched telephone network (PSTN) is becoming a key tool for efficient businesses in today's world. There are multiple UC solutions available to businesses today, most of which require deploying and maintaining server and network infrastructure on-premise. These solutions offer some control to the local administrators, but can result in significant costs that are associated with initial deployment, maintenance and administration of the system.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A hybrid Unified Communications (UC) telephony deployment includes users of a tenant that are hosted between a UC cloud deployment and a UC on-premise deployment. An identity of a tenant and its' users are maintained consistently between the on-premise and cloud based UC deployment (e.g. telephone numbers, dialing preferences, voice mail . . . ). Each user of the tenant can register with the UC service from one or more locations (e.g. on-premise, off-premise, home, office, store . . . ) whether or not they are hosted by the on-premise deployment or the cloud based UC deployment. Functionality of the UC deployment may also be maintained at one or more locations within the hybrid UC deployment. For example, some services (e.g. voicemail, or other services) can be hosted in the cloud while the remaining services are hosted on-premise. Different Telco providers may be chosen by the tenant to provide PSTN services for one or more users of the tenant.

DETAILED DESCRIPTION

Figure 1:
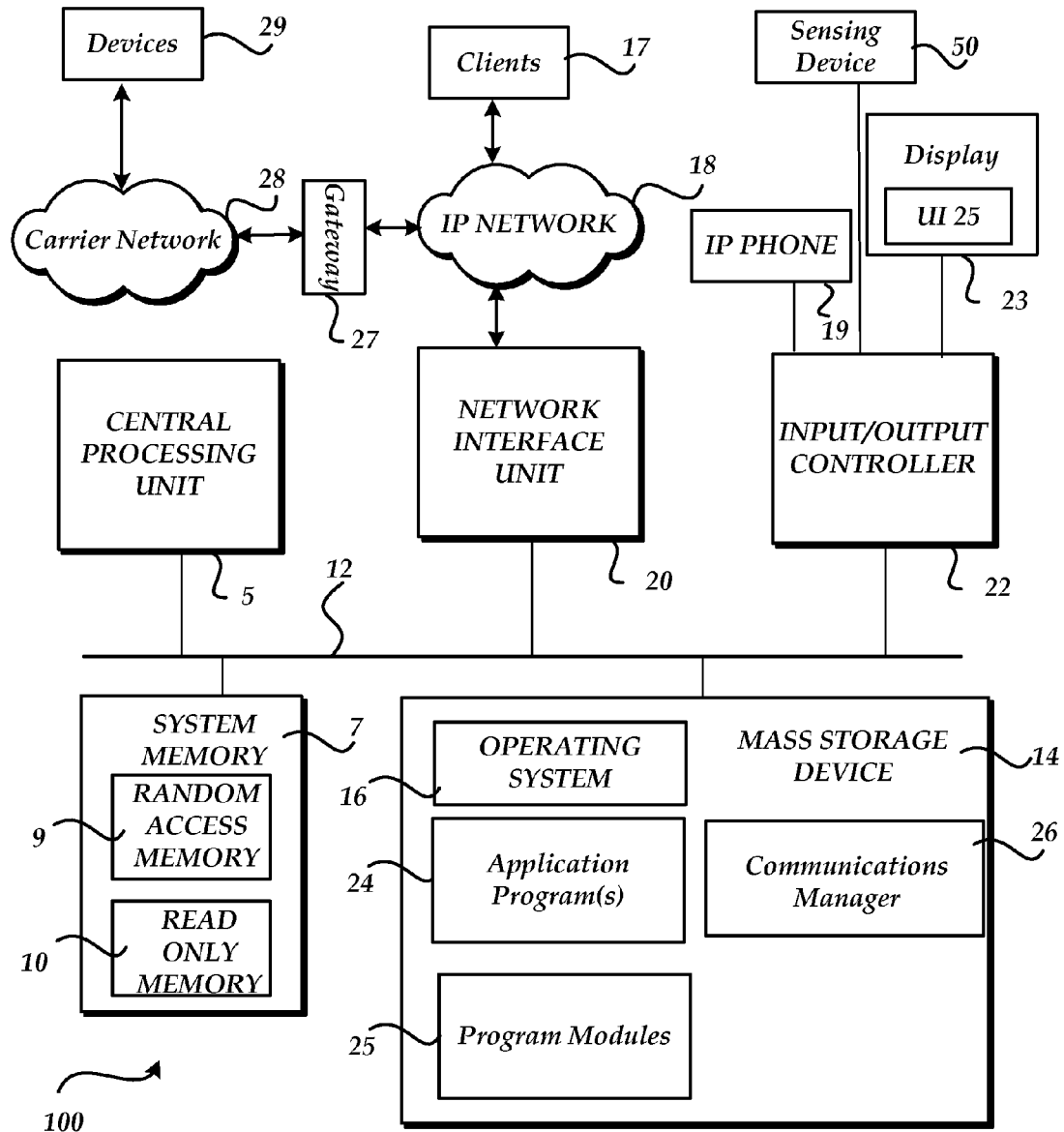
FIG. 1 illustrates an exemplary computing environment.

Referring now to the drawings, in which like numerals represent like elements, various embodiment will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer environment for a computer 100 utilized in the various embodiments will be described. The computer shown in FIG. 1 may be configured as a server, a desktop or mobile computer, or some other type of computing device and includes a central processing unit 5 ("CPU"), a system memory 7, including a random access memory 9 ("RAM") and a read-only memory ("ROM") 10, and a system bus 12 that couples the memory to the central processing unit ("CPU") 5. The computer may be configured to be used within different environments, including but not limited to within a UC cloud deployment, a UC on-premise deployment, and the like. Cloud, cloud based, cloud based service and/or cloud computing refers to the logical computational resources (data, software) that are accessible via a computer network (through WAN or Internet etc.), rather than from a local computer.

A basic input/output system containing the basic routines that help to transfer information between elements within the computer, such as during startup, is stored in the ROM 10. The computer 100 further includes a mass storage device 14 for storing an operating system 16, application program(s) 24, other program modules 25, and communication manager 26 which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

Computer 100 operates in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, including a keyboard, mouse, or electronic stylus (not shown in FIG. 1). Similarly, an input/output controller 22 may provide input/output to an IP phone 19, a display screen 23, a printer, or other type of output device. A camera and/or some other sensing device 50 may be operative to record one or more users and capture motions and/or gestures made by users of a computing device. Sensing device may be further operative to capture spoken words, such as by a microphone and/or capture other inputs from a user such as by a keyboard and/or mouse (not pictured). Sensing device 50 may comprise any motion detection device capable of detecting the movement of a user. For example, a camera may comprise a MICROSOFT KINECT® motion capture device comprising a plurality of cameras and a plurality of microphones.

Embodiments of the invention may be practiced via a system-on-a-chip (SOC) where each or many of the components/processes illustrated in the FIGURES may be integrated onto a single integrated circuit. Such a SOC device may include one or more processing units, graphics units, communications units, system virtualization units and various application functionality all of which are integrated (or "burned") onto the chip substrate as a single integrated circuit. When operating via a SOC, all/some of the functionality, described herein, with respect to the Unified Communications via application-specific logic integrated with other components of the computing device/system 100 on the single integrated circuit (chip).

Carrier network 28 is a network that may be used for communicating with devices 29, which may be both PSTN phones or other devices. The carrier network 28 may include both wireless and wired components. For example, carrier network 28 may include a cellular tower that is linked to a wired telephone network. Typically, the cellular tower carries communication to and from mobile devices, such as cell phones, notebooks, pocket PCs, long-distance communication links, and the like.

Gateway 27 routes messages between carrier network 28 and IP Network 18. For example, communications manager 26 may route a call received from a client connected to IP network 18 that is a user of a tenant hosted in the hybrid UC deployment to a mobile device on carrier network 28. Gateway 27 provides a means for transporting the communication from the IP network to the carrier network. Conversely, a user with a device connected to a carrier network may be directing a call to a client on IP network 18 (e.g. such as a user hosted in the hybrid UC deployment).

As mentioned briefly above, a number of program modules and data files may be stored in the mass storage device 14 and RAM 9 of the computer 100, including an operating system 16 suitable for controlling the operation of a computer, such as WINDOWS SERVER® or the WINDOWS 7® operating system from MICROSOFT CORPORATION of Redmond, Wash. The mass storage device 14 and RAM 9 may also store one or more program modules. In particular, the mass storage device 14 and the RAM 9 may store one or more application programs 24 and program modules 25.

Generally, communications manager 26 is configured to be used as part of a hybrid UC deployment for routing communications. While communications manager 26 is illustrated as an independent program, the functionality may be integrated into other software and/or hardware. The operation of communications manager 26 is described in more detail below. Generally, a hybrid Unified Communications (UC) deployment is employed by one or more tenants. Some users of a tenant may be hosted by a UC cloud deployment while other users of the tenant may be hosted using a UC on-premise deployment for the tenant. Some tenants may be hosted entirely by the UC cloud deployment without having a UC on-premise deployment for some of its users. An identity of a tenant and its' users are maintained consistently between the on-premise and cloud based UC deployment (e.g. telephone numbers, dialing preferences, voice mail . . . ). Each user of the tenant can register with the hybrid UC service from one or more locations (e.g. on-premise, off-premise, home, office, store . . . ) whether or not they are hosted on-premise or hosted on the cloud deployment. Functionality of the hybrid UC deployment may also be maintained at one or more locations. For example, some services (e.g. voicemail, or other services) can be hosted in the cloud while the remaining services are hosted on-premise. Different Telco providers may be chosen by the tenant to provide PSTN services for one or more users of the tenant.

Figure 2:
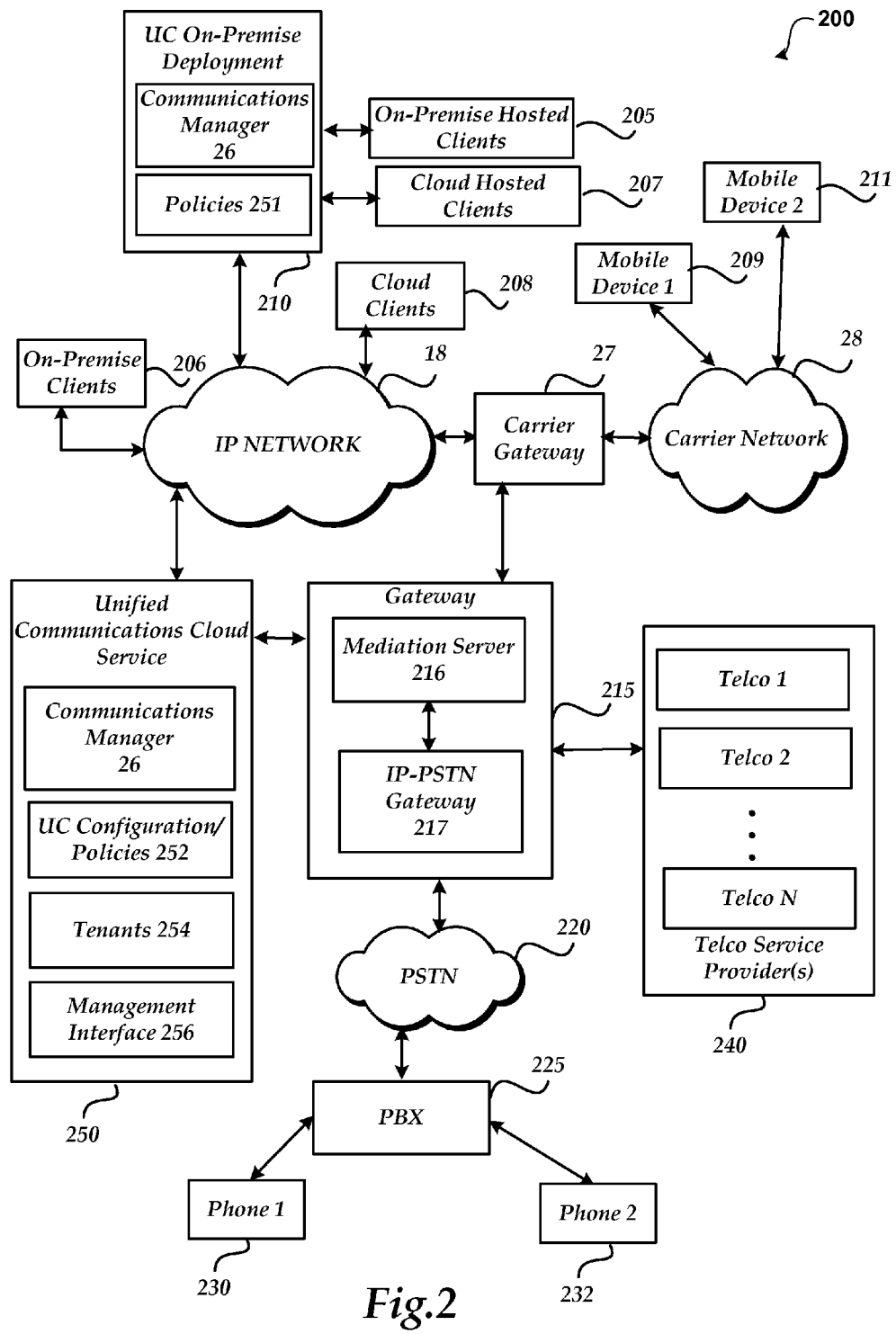
FIG. 2 shows a hybrid unified communications system including a UC cloud deployment and a UC on-premise deployment.

FIG. 2 shows a hybrid unified communications system including a UC cloud deployment and a UC on-premise deployment.

As illustrated, system 200 includes a hybrid unified communications deployment that includes UC cloud service 250 and UC on-premise deployment 210 coupled through IP network 18. Hybrid UC deployment comprises on-premise hosted clients 205, 206 that are hosted on-premise by a tenant and cloud hosted clients 207, 208 that are hosted by the UC cloud service for the tenant. More than one on-premise deployment may be used by a tenant. For example, a tenant may include a UC on-premise deployment at each office location that is of a sufficient size to justify the cost.

On-premise hosted clients and cloud hosted clients may register with the hybrid UC service from different locations (e.g. on-premise/off-premise). As illustrated, on-premise hosted clients 205 and cloud hosted clients 207 register on-premise. On-premise clients 206 and cloud clients 208 are shown as registering off-premise (e.g. on an external network from the on-premise deployment).

One or more ISPs may be configured to provide Internet access to the clients and may use wired and/or wireless communication lines. Further, each client is configured to communicate with Plain Old Telephone Service (POTS) via PSTN 220, or Private Branch exchange (PBX) 225. A PSTN interface such as a gateway 215 may provide access between POTS/PSTN and the IP data network. The PSTN interface may translate VoIP data packets into circuit switched voice traffic for PSTN and vice versa. The PSTN may include land line devices (e.g. phone 1, phone 2), mobile devices, and the like.

Conventional voice devices, such as phone 1 may request a communication with a user of a tenant that is hosted by the hybrid UC deployment. The communication may be a phone call, Instant Message, application sharing, and the like. A user that is hosted by the hybrid UC deployment may specify which devices are to be used in connecting a communication (e.g. a telephone call) based on a variety of conditions (e.g., connection based on the calling party, the time of day, etc.). According to an embodiment, a user of the tenant and/or an administrator of the tenant may specify items such as: dialing rules, call authorizations, voice policies (which control calling features like delegation, team call) and the like.

The hybrid UC deployment including cloud based UC service 250 and an on-premise UC service 210 for a tenant are configured to route communications to the appropriate destinations. According to an embodiment, the UC services utilize the SIP protocol. For more information on this industry standard protocol see IETF RFC 3261 which may be found at http://www.ietforg/rfc/rfc3261.txt. Generally, SIP defines a standard for session setup, termination, and media negotiation between two parties that is widely used for Voice-over-IP (VoIP) call signaling. Other protocols may be used in place of and/or in addition.

The communication manager 26 of the UC cloud service 250 and on-premise deployment 210 route communications to different endpoints on the IP network (IP-IP calls); routes calls to the public switched telephone network (PSTN)/PBX (IP-PSTN calls) and may also route calls to destinations using other networks, such as carrier network 28. The communications manager(s) 26 may be coupled to the networks through one or more gateways. A gateway translates signaling and media between the network and the IP voice infrastructure. Gateway 215 may be composed of one or more devices. For example, gateway 215 may be implemented as a mediation server 216 and an IP-PSTN gateway 217 or the functionality of the mediation server and the IP-PSTN may be included within the gateway as illustrated. Generally, IP-PSTN gateway 217 is a gateway that is located between a landline phone (i.e. phone 1 or phone 2) and any SIP User Agent Client (i.e. on-premise clients 205, 206 and cloud clients 207, 208). Gateway 217 allows a person to call any (allowed) telephone number from any SIP-compliant client application.

Mediation Server 216 provides signaling and media translation between the VoIP infrastructure and a gateway. Mediation Server 216 also links the hybrid UC deployment with different Telco providers 240 that may be used with one or more of the hosted users of a tenant. For example, one Telco provider may be selected to be used by a first set of users of the tenant, whereas another Telco provider is selected to be used by another set of users for the client. UC configuration information, such as routing information (e.g. a list of machine names corresponding to one or more Session Border Controllers (SBCs) on each available/selected Telco provider)) is stored. According to an embodiment, the information is stored in UC cloud service 250. Each Telco provider that is selectable by a tenant is also provisioned with location information of one or more mediation edge servers of the hybrid UC deployment to which they can route incoming calls from PSTN. A private resilient MTLS (Mutual Transport Layer Security) pipe can also be setup between the Telco provider network and the UC cloud service 250.

On the UC cloud service side, the mediation server 216 may listen on a mutual TLS transport address. TLS (Transport Layer Security) is a protocol for establishing a secure connection between a client and a server. TLS (Transport Layer Security) is capable of authenticating both the client and the server and creating an encrypted connection between the two. The TLS (Transport Layer Security) protocol is extensible, meaning that new algorithms can be added for any of these purposes, as long as both the server and the client are aware of the new algorithms. On the gateway side, a mediation server listens on a single TCP/IP transport address. Generally, a mediation server is configured for talking to gateways over a simple TCP or MTLS connections. For example, mediation server 216 may be configured for: translating SIP over TCP or MTLS (on the gateway side) to SIP over mutual TLS (on the Enterprise Voice side); encrypting and decrypting SRTP (Secure Real-time Transport Protocol) on the UC cloud side; translating media streams between the UC cloud and the gateway; connecting clients that are outside the network to internal ICE (Interactive Connectivity Establishment) components, which enable media traversal of NAT and firewalls; and acting as an intermediary for call flows that a gateway does not support, such as calls from remote workers on an enterprise voice client. Mediation Servers/Gateways may also be configured to bypass the media. For example, the mediation server may be in the control path for handling signaling back and forth while the actual media flows directly between the client and the gateway.

UC cloud service 250 is configured to provide unified communication services for one or more locations and one or more tenants. For example, UC cloud service 250 may be utilized by a business having branch offices that are connected using IP Network 18 and/or other IP networks. Some/all of the branch offices may include an on-premise UC deployment. Communications manager 26 is configured to assist in routing communications from/to the hybrid UC deployment.

A management interface 256 is provided that is configured to allow an authorized user (e.g. an administrator) of a tenant to configure the hybrid UC deployment for the tenant. For example, management interface 256 may be used by the administrator to select one or more Telco providers from the available Telco service provider(s) 240 to service one or more of the users. The management interface may also be used to create various policies and rules that control items such as dialing rules, call authorizations, call control features, and the like. In this way, each individual tenant can create and maintain their own policies/rules.

The following processes and examples are provided to illustrate a hybrid UC deployment. The examples are for illustration purposes only, and are not intended to be limiting.

Figure 3:
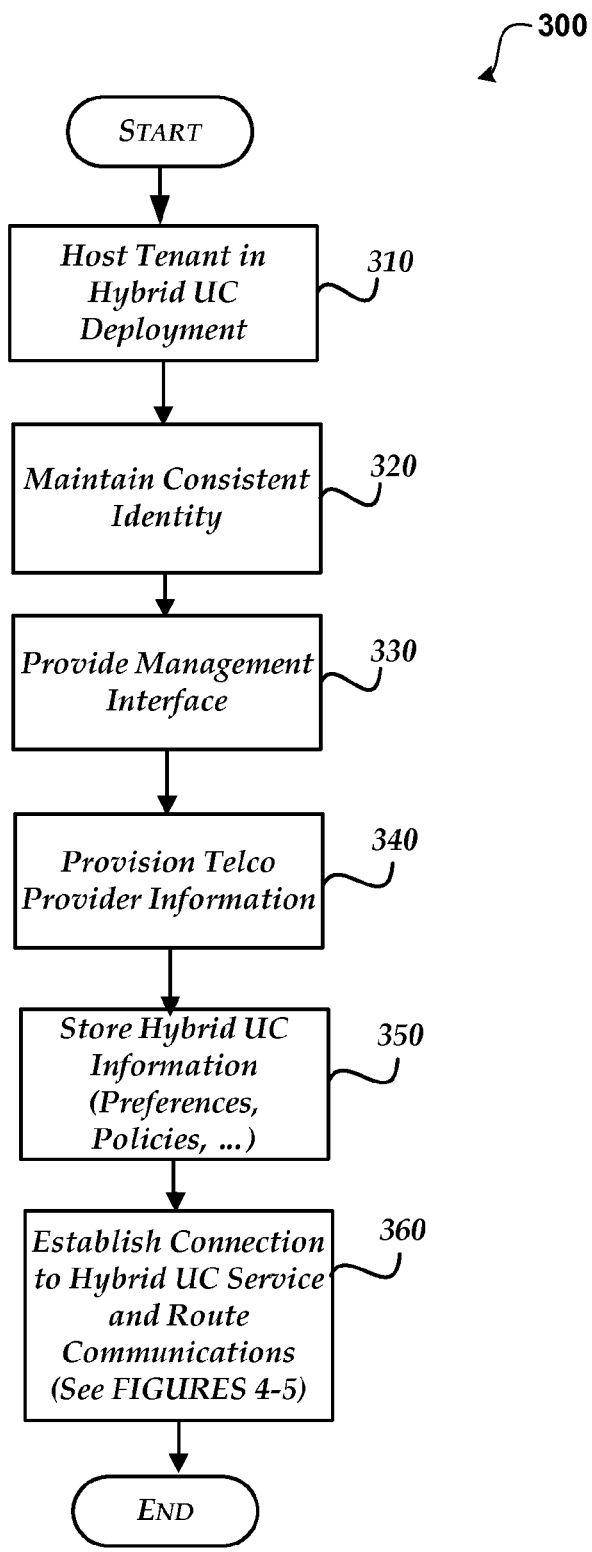
FIG. 3 shows an illustrative process for hosting a tenant in a hybrid UC deployment.
Figure 4:
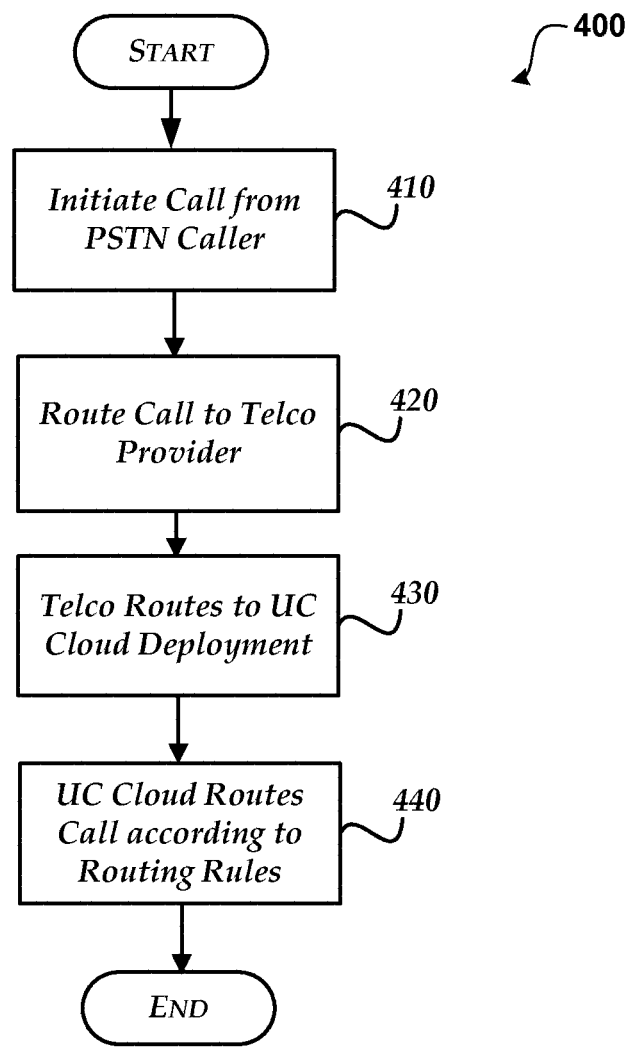
FIG. 4 shows a process for an incoming PSTN call to a hybrid UC deployment.
Figure 5:
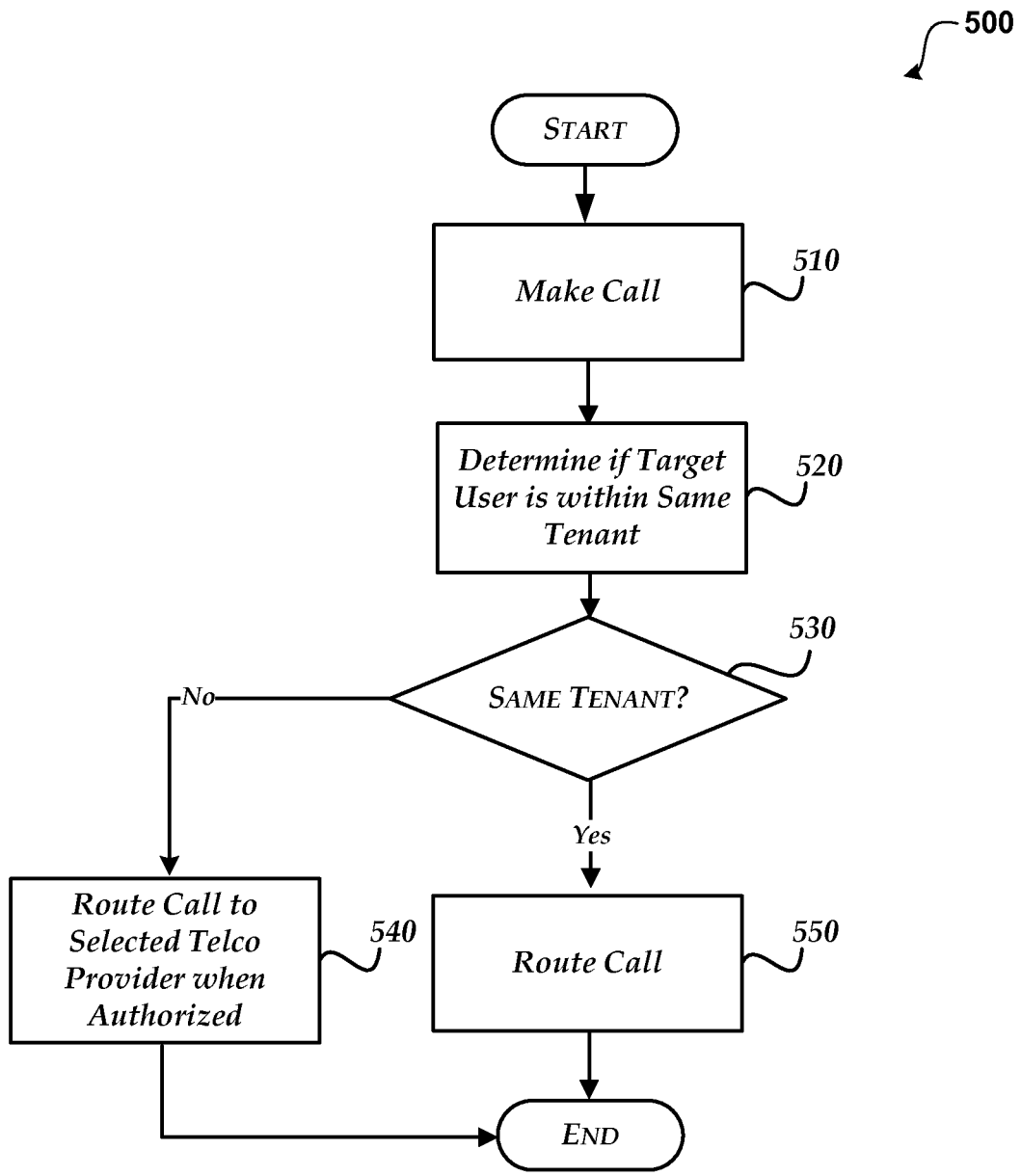
FIG. 5 shows a process for an outgoing call from a hybrid UC deployment to a PSTN device.

FIGS. 3-5 shows processes for using a hybrid UC deployment. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

FIG. 3 shows an illustrative process 300 for hosting a tenant in a hybrid UC deployment.

After a start operation, the process flows to operation 310, where a tenant is hosted in both a UC on-premise deployment and a UC cloud deployment. For example, a tenant may configure the hybrid UC deployment to host some of its users in an on-premise deployment for the UC service and host some of its other users in the cloud based UC service.

Moving to operation 320, an identity of the tenant and its users is maintained consistently between the on-premise and the cloud deployment. For example, a user may login using the same ID and login process to the UC service from any location (e.g. on-premise/off-premise).

Flowing to operation 330, a management interface is provided that allows each tenant to configure the hybrid UC deployment. For example, the interface may be used by an administrator of the tenant to select one or more Telco providers to service one or more of the users. Each tenant administrator can shop around for the best deal among the various Telco providers to select one or more Telco providers to handle the PSTN traffic for its users. The interface may also be used to create and store one or more instances of various policies that control items such as dialing rules, call authorizations, call control features, and the like. According to an embodiment, these policies are associated with a specific tenant and are assigned to the users belonging to that tenant. Each tenant may establish its own policies. Policies may be imported/exported between the UC on-premise deployment and the UC cloud deployment. For example, if the tenant has already configured policies for a UC on-premise deployment, an administrator may choose to import established policies from the UC on-premise deployment to the UC cloud deployment.

Transitioning to operation 340, the hybrid UC deployment is provisioned with the routing information for the available Telco providers. For example, a list of machine names corresponding to one or more Session Border Controllers (SBCs) for the Telco providers may be provisioned. Similarly, the Telco providers are provisioned with the location information of one or more mediation edge servers of the hybrid UC deployment to which they can route incoming calls from PSTN. According to an embodiment, a private resilient MTLS (Mutual Transport Layer Security) pipe can be setup between the Telco network and the UC cloud deployment to help ensure confidentiality, integrity and high-availability.

Moving to operation 350, configuration information, settings, policies and preferences are stored. According to an embodiment, the information includes Telco provider information, user information, tenant information, dialing rules, call authorizations, call control features, and the like. According to an embodiment, the information is stored such that it accessible on-premise and/or off-premise.

Flowing to operation 360, users establish connection to the hybrid UC service (on-premise/off-premise) which then routes the communications (e.g. See FIGS. 4-5 and related discussion).

The process then flows to an end operation and returns to processing other actions.

FIG. 4 shows a process 400 for an incoming PSTN call to a hybrid UC deployment.

After a start operation, the process moves to operation 410, where a call is received from a PSTN caller. For example, a mobile user may call the phone number assigned to a user belonging to a tenant hosted in the UC cloud.

Moving to operation 420, the call is routed to the Telco provider that serves the number via the PSTN network.

Flowing to operation 430, the Telco provider routes the call to the cloud UC deployment. For example, the Telco provider sends the request from a session border controller (SBC) to a mediation edge server the Telco is configured with.

Transitioning to operation 440, the UC cloud services determines the user associated with the called phone number and routes the call according to that user's routing rules. The call may be routed to a cloud hosted user or an on-premise hosted user. According to an embodiment, when no routing rules are defined, the call is automatically forked to the registered endpoints for that user. When there are no endpoints for that user or if none of the endpoints answer the call within a user-defined period of time, the call is routed to the Unified messaging destination of that user where the caller can leave a voicemail. When no UM destination is specified, a call failure is returned to the PSTN network.

The process then flows to an end operation and returns to processing other actions.

FIG. 5 shows a process 500 for an outgoing call from a hybrid UC deployment to a PSTN device.

After a start operation, the process moves to operation 510, where a user that is hosted by a UC hybrid deployment (either on-premise or within the UC cloud service) decides to call a PSTN number from their client. According to an embodiment, the client sends a SIP INVITE request targeted at the phone number the user wants to call.

Moving to operation 520, when the SIP INVITE reaches a UC server in the UC cloud service, a determination is made as to whether the target phone number matches a phone number of a user that is within the same tenant (intra-tenant call).

Decision operation 530 determines when the target phone number matches the phone number of a user that is within the same tenant. In the case where the number does not match a user for the tenant, the process flows to operation 540. In the case where the number does match a user for the tenant, the process flows to operation 550.

At operation 540, the call is routed to the selected Telco provider that has been selected to service the calling user's phone number when authorized. According to an embodiment, a determination is made before routing the call to determine that the calling user is authorized to call that particular number. Other rules/policies may also be applied before routing the call.

At operation 550, the call is routed to the number. The call may be routed using different methods. For example, when the phone number called by the user happens to be the number assigned to another user belonging to the same tenant, the call is not routed out to PSTN and instead, the call is routed based on the call routing rules of the target user. When the phone number called by the user happens to be the number assigned to another user belonging to a different tenant, the routing may be configured to route the call out to PSTN (which comes back to the same deployment) or routes the call directly based on the target user's routing preferences. According to an embodiment, the action for a particular call is decided based on federation policies assigned to the user. While routing directly to target user would be less expensive for the tenant (since they don't have to pay PSTN charges), in some regions, this may violate local laws (legal intercept, toll bypass etc.).

The process then flows to an end operation and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for providing a hybrid Unified Communications (UC) deployment including telephony, comprising:
   hosting a tenant including users using both a UC cloud deployment including PSTN communications that hosts some of the users of the tenant and that is integrated with a UC on-premise deployment for the tenant that hosts other users of the tenants;
   maintaining an identity of the tenant consistently between the UC cloud deployment and the UC on-premise deployment;
   storing policies that are used in both the UC cloud deployment and the UC on-premise deployment;
   associating a selection of a Telco provider from the tenant that is to provide PSTN services; and
   routing an outbound call to another user of the tenant without using the Telco provider in response to receiving the outbound call for a telephone number from a user of the tenant.

2. The method of claim 1, further comprising receiving a selection of a Telco provider from the tenant to provide PSTN services for a portion of users of the tenant.

3. The method of claim 1, further comprising storing dialing rules, call authorizations, and polices for a user within the cloud deployment for users assigned to the cloud deployment and the on-premise deployment.

4. The method of claim 1, further comprising allowing a user to login to either the UC cloud deployment and the UC on-premise deployment using a same login in order to make/receive PSTN calls.

5. The method of claim 1, further comprising: providing an interface that is configured to manage the tenant both on the cloud deployment and the on-premise deployment.

6. The method of claim 1, further comprising receiving an incoming PSTN call; routing the call to a selected Telco provider chosen by the tenant that serves a number that is associated with the call; and routing the call based on the tenant's routing rules.

7. The method of claim 1, further comprising receiving an outbound call for a telephone number from a user of the tenant and when the outbound call is not directed to another user of the tenant from where the call originates, determining policies assigned to the user to determine when the user is authorized to call the telephone number, and when the user is authorized, routing the outbound call to the Telco provider that services the calling user's phone number.

8. The method of claim 1, further comprising receiving an outbound call for a telephone number from a user of the tenant and when the outbound call is directed to a different tenant that is hosted by the UC deployment, routing the call directly to the different tenant.

9. The method of claim 1, further comprising receiving an outbound call for a telephone number from a user of the tenant and when the outbound call is directed to a different tenant that is hosted by the UC deployment from where the call originates, routing the call using the Telco provider that services the calling user's phone number, wherein the call is returned by the Telco provider to the UC deployment.

10. A computer-readable storage medium, excluding a signal, having computer-executable instructions for interacting with a hybrid Unified Communications (UC) telephony deployment, comprising:
hosting a tenant including users that are hosted between a UC cloud deployment including PSTN communications and a UC on-premise deployment for the tenant;
receiving a selection of a Telco provider from the tenant that is to provide PSTN services for one or more users of the tenant;
providing a user interface for an authorized user of the tenant to configure aspects of the UC hybrid telephony deployment comprising associating users between the UC cloud deployment and the UC on-premise deployment; and
maintaining an identity of the tenant across the UC cloud deployment and the UC on-premise deployment;
routing an outbound call to another user of the tenant without using the Telco provider in response to receiving the outbound call for a telephone number from a user of the tenant.

11. The computer-readable storage medium of claim 10, further comprising storing policies in the UC cloud deployment that are used in both the UC cloud deployment and the UC on-premise deployment.

12. The computer-readable storage medium of claim 10, further comprising allowing a user of the tenant to login to both the hybrid UC cloud using a same login when on-premise and off-premise.

13. The computer-readable storage medium of claim 10, further comprising receiving policies from the tenant that are applied only to the users of the tenant and not to users of other tenants.

14. The computer-readable storage medium of claim 10, further comprising maintaining a user to phone number mapping within a data store of the UC cloud deployment and maintaining routing information to the selected Telco provider.

15. The computer-readable storage medium of claim 10, further comprising receiving an outbound call from the hybrid UC deployment and when the outbound call is not directed to another user of the tenant from where the call originates, determining policies assigned to the user to determine when the user is authorized to call the telephone number, and when the user is authorized, routing the outbound call to the Telco provider that services the calling user's phone number.

16. The computer-readable storage medium of claim 10, further comprising receiving an outbound call for a telephone number from a user of the tenant and when the outbound call is directed to a different tenant that is hosted by the UC deployment, routing the call directly to the different tenant.

17. The computer-readable storage medium of claim 10, further comprising receiving an outbound call for a telephone number from a user of the tenant and when the outbound call is directed to a different tenant that is hosted by the UC deployment from where the call originates, routing the call using the Telco provider that services the calling user's phone number, wherein the call is returned by the Telco provider to the UC deployment.

18. A system for providing a hybrid Unified Communications (UC) telephony deployment, comprising:
a data store that is configured to configuration information and mapping information to different Telco providers for the hybrid UC telephony deployment;
a network connection that is configured to connect a UC on-premise deployment that hosts some users of a tenant with a UC cloud deployment that hosts other users of the tenant;
a processor and a computer-readable medium;
an operating environment stored on the computer-readable medium and executing on the processor; and
a communications manager operating under the control of the operating environment and operative to:
receive a selection of a Telco provider from the tenant that is to provide PSTN services for one or more users of the tenant;
provide a user interface for an authorized user of the tenant to configure aspects of the UC hybrid deployment comprising associating users between the UC cloud deployment and the UC on-premise deployment;
maintain an identity of the tenant across the UC cloud deployment and the UC on-premise deployment; and
route communications for the tenant including routing an outbound call to another user of the tenant without using the Telco provider in response to receiving the outbound call for a telephone number from a user of the tenant.

19. The system of claim 18, wherein routing the communications for the tenant comprises changing a use of the selected Telco provider based on when a call is for a user of the tenant.

20. The system of claim 18, further comprising allowing a user of the tenant to login to both the hybrid UC cloud using a same login when on-premise and off-premise.

* * * * *